E. THOMSON.
VAPORIZER FOR INTERNAL COMBUSTION ENGINES.
APPLICATION FILED JULY 14, 1906.
1,021,220.
Patented Mar. 26, 1912.
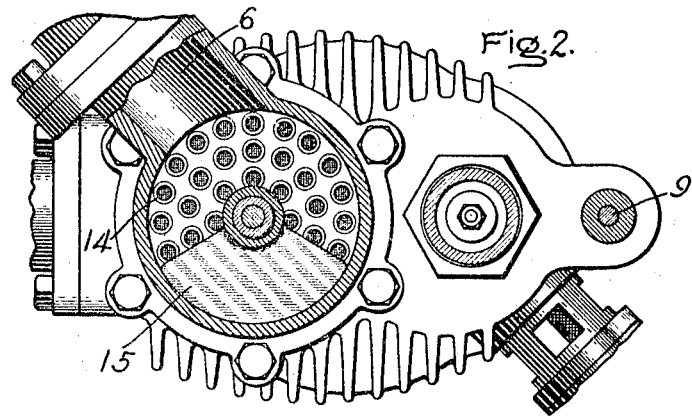
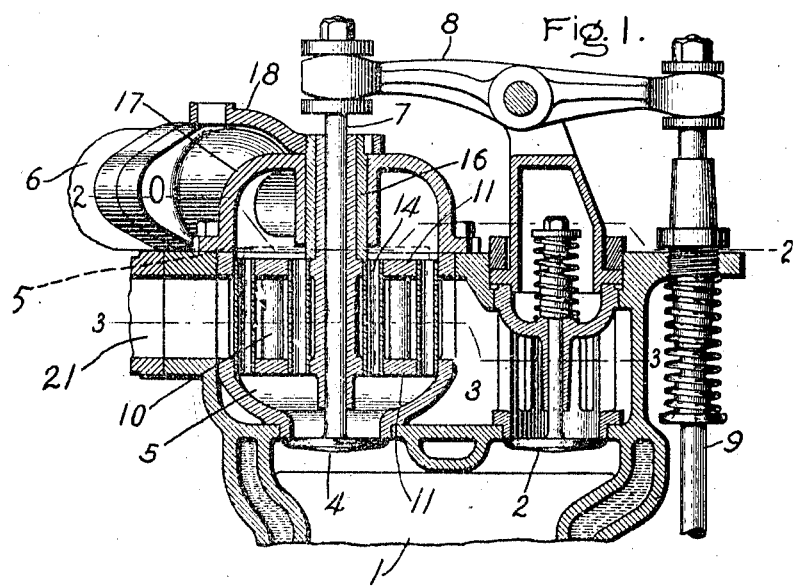
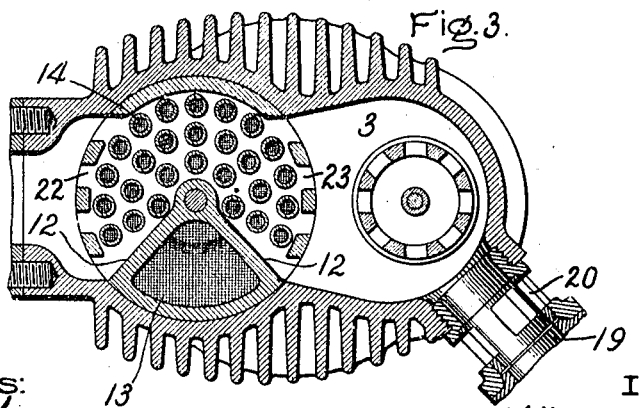
Witnesses:
Inventor,
Elihu Thomson,
By Albert G. Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

VAPORIZER FOR INTERNAL-COMBUSTION ENGINES.

1,021,220. Specification of Letters Patent. Patented Mar. 26, 1912.

Application filed July 14, 1906. Serial No. 326,171.

*To all whom it may concern:*

Be it known that I, ELIHU THOMSON, a citizen of the United States, residing at Swampscott, county of Essex, State of Massachusetts, have invented certain new and useful Improvements in Vaporizers for Internal-Combustion Engines, of which the following is a specification.

The present invention relates to vaporizers for the motive fluid or fuel charge of internal combustion or other engines which utilize heat from the exhaust gases to vaporize the fuel in the incoming fluid charge.

There are a number of circumstances which make it desirable to vary the quantity of heat imparted by the vaporizer to the incoming charge. Thus, the fuels used may have different boiling points. For instance, when alcohol is used the amount of heat necessary to vaporize the charge is much less than when oil or kerosene is used and the amount will vary with different grades of kerosene. Or, if the vapor be overheated on entering the engine, pre-ignition and pounding are apt to result. Also, a greater delivery of heat to the vaporizer may be required when starting the engine than is necessary after the whole engine is warmed up. The amount of heating surface when the engine is working under full load and burning more fuel need not be so great as when under a light load requiring a less quantity of fuel. Again, in cold weather, the charge of air and fuel will usually be cooler than in warm weather. The heating surface must be accordingly varied to meet weather conditions.

The object of the invention is to provide means for so controlling the heat supplied to the charge by the vaporizer that efficient operation of the engine is secured under the circumstances enumerated.

In the drawings illustrating one embodiment of my invention, Figure 1 is a sectional elevation of so much of an engine as is necessary to understand my invention; Fig. 2 is a sectional plan view on line 2—2 of Fig. 1; and Fig. 3 is a similar view on line 3—3 of Fig. 1.

1 represents the upper end of a cylinder of an internal combustion engine. The inlet valve 2 held to its seat by a suitable spring controls the admission of the fuel charge to the cylinder from the chamber 3. The exhaust valve 4 controls the passage of the exhaust gases from the cylinder to the chamber 5 and the exhaust pipe 6. The upper end of the exhaust valve stem 7 engages one end of a lever 8. A rod 9 connects the other end of said lever with an actuating device of any suitable construction which controls the operation of the valve. On their way to exhaust pipe 6, the hot exhaust gases pass through a vaporizer 10 having a cylindrical body or casing with two heads 11 extending across the same to two radial partitions 12 extending from the center of the vaporizer to its cylindrical wall. These partitions together with suitable openings in said heads form a sector-shaped passage 13 for the exhaust parallel to the axis of the vaporizer. Other passages 14 for the exhaust are formed by a plurality of tubes mounted in the heads. The flow of the exhaust gases through the passages 13 and 14 is under control of a rotary valve or damper 15 having a sleeve 16 mounted upon a cylindrical member projecting from the upper head 11. The sleeve 16 is also supported by a hub on the inside of the cover 17 of the exhaust chamber 5. The lever or handle 18 secured to the upper end of the sleeve 16 provides a means for turning the damper about the axis of the vaporizer to open and close the passage 13 and to open and close the passages 14. This movement of the damper may be manually controlled by the attendant or it may be subject to the automatic control of some suitable device which is responsive to changes in temperature or pressure in some part of the system.

When starting, a passage 19 having an adjustable air inlet 20 admits air mixed with gasolene vapor, or vapor from any other suitable fluid which vaporizes at a comparatively low temperature, to the chamber 3. The damper 15 is moved to the position shown in Fig. 2 to expose the maximum vaporizing heating surface. The vapor charge is ignited by a suitable device and the exhaust from the engine running under these conditions soon raises the temperature of the vaporizer to the degree necessary to volatilize the regular fuel charge which requires a comparatively high temperature for volatilization. The charge entering by the passage 19 will then be shut off and a suitable charge containing the regular fuel admitted through pipe 21. This charge flows through the openings 22 in the body of the vaporizer, passes around the tubes through the interior of which the heated exhaust gases travel and enters the chamber 3 by the openings 23. The fuel of the charge is vaporized during this passage through the vaporizer. The position of valve or damper 15 regulates the extent of the heating surface exposed to the flow of the exhaust gases and thereby affords a means for regulating the heat supplied to the incoming charge to maintain it at the temperature required for efficient operation.
It is well known that if the charge becomes too hot the power of the engine will fall below the normal. On the other hand, the temperature must not fall below a point sufficiently high to volatilize the fuel in the charge. The tendency to pre-ignition will indicate to the attendant that the temperature is too high. The attendant should run the vaporizer at the minimum vaporizing temperature consistent with the regularity of explosion and the regular working of the engine.

The heating surface may be regarded as consisting substantially of two portions, namely, that of the tubular passages 14 and that of the sector-shaped passage 13. The combined surfaces of the passages of the tubular portion are much larger than the surface of the passage 13, hence the effective heating is greater. The damper is of such dimensions that it may completely cover the passage 13 but when in this position, Fig. 2, the tubular passages 14 are all open and the heating surface exposed to the flow of the exhaust gases is a maximum.
The minimum effect is produced when the passage 13 is fully uncovered because the gases flowing through said passage affect a relatively small heating surface and the maximum number of the passages 14 are closed. The passage 13 forms a sort of by-pass for the tubular portion of the heater.

As will be obvious, numerous effects between the maximum and the minimum may be secured by turning the damper or valve to cover a greater or less portion of the passage 13 and uncover a corresponding number of the passages 14.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by equivalent means.

What I claim as new and desire to secure by Letters Patent of the United States, is,—

1. An internal combustion engine, in combination with a vaporizer for the motive fluid having a plurality of passages of different sizes through which the exhaust gases may flow, and a means for controlling the flow through said passages to regulate the temperature of the incoming charge of motive fluid.

2. In an engine, an exhaust chamber, a valve seat at one end of the chamber, an exhaust valve engaging said seat and having its stem extending centrally through the chamber, a heater or vaporizer surrounding the stem in the chamber having passages for the motive fluid and exhaust gases respectively, including a by-pass through which the exhaust gases may flow, and a means for controlling the flow through said by-pass to regulate the temperature of the incoming charge of motive fluid.

3. A vaporizer for the motive fluid of an engine having a body portion, perforated heads extending across the body portion, a series of hollow members connecting the heads to form exhaust passages through the vaporizer from the perforations of one head to those of another, a cylindrical projection on one head, a rotary damper mounted on the projection to move over the surface of said head to open and close the passages to control the flow of the exhaust therethrough, and means for operating said damper.

4. A vaporizer for the motive fluid of an engine having upper and lower heads, a series of tubes secured in the heads and extending from the outer surface of one head to the outer surface of the other, radial partitions extending between the heads to form with suitable openings in said heads, a sector-shaped passage parallel to the tubular portion of said vaporizer, a sector-shaped damper of sufficient size to close said passage rotatably mounted to move over the surface of one of the heads to open and close the sector-shaped passage and to open and close the passages through the tubes, and means to operate said damper.

5. A vaporizer for the fuel charge of an internal combustion engine having a relatively large hollow member and a series of smaller hollow members through the interior passages of which the exhaust gases may flow, the body of said vaporizer having openings for the entrance and exit of the fuel charge which is vaporized by contact with the outer surfaces of the hollow members, and a means for opening and closing the passages through said hollow members which as it opens the larger passage closes a portion of the series of smaller passages and vice versa.

In witness whereof, I have hereunto set my hand this eleventh day of July, 1906.

ELIHU THOMSON.

Witnesses:
JOHN A. MCMANUS, Jr.,
HENRY O. WESTENDARP.